(12) United States Patent
Thomas et al.

(10) Patent No.: US 11,098,692 B2
(45) Date of Patent: Aug. 24, 2021

(54) WIND TURBINE DEVICE

(71) Applicant: Ventana Tek, LLC, American Fork, UT (US)

(72) Inventors: John A. Thomas, American Fork, UT (US); Brett Romney, American Fork, UT (US)

(73) Assignee: VENTANA IP, LLC, American Fork, UT (US)

( * ) Notice: Subject to any disclaimer, the term of this patent is extended or adjusted under 35 U.S.C. 154(b) by 0 days.

(21) Appl. No.: 16/288,969

(22) Filed: Feb. 28, 2019

(65) Prior Publication Data

US 2020/0032769 A1  Jan. 30, 2020

Related U.S. Application Data

(60) Provisional application No. 62/703,599, filed on Jul. 26, 2018.

(51) Int. Cl.
*F03D 3/06* (2006.01)
*F03D 3/00* (2006.01)

(52) U.S. Cl.
CPC ............. *F03D 3/061* (2013.01); *F03D 3/005* (2013.01); *F05B 2240/213* (2013.01); *F05B 2250/712* (2013.01)

(58) Field of Classification Search
CPC .... F03D 3/061; F03D 3/005; F05B 2240/213; F05B 2240/301; F05B 2250/311; F05B 2250/711; F05B 2250/712
See application file for complete search history.

(56) References Cited

U.S. PATENT DOCUMENTS

| 4,005,947 A * | 2/1977 | Norton | F03D 3/007 416/197 A |
| 7,008,171 B1 * | 3/2006 | Whitworth | H02S 10/12 415/4.2 |
| 8,358,030 B2 * | 1/2013 | Plaskove | F03D 9/25 290/55 |
| 2014/0010654 A1 * | 1/2014 | Fajardo | F01D 7/00 416/147 |

FOREIGN PATENT DOCUMENTS

DE  102017004714 A1 * 11/2018  ............ F03D 3/002

* cited by examiner

*Primary Examiner* — Brian P Wolcott
(74) *Attorney, Agent, or Firm* — Patentfile, LLC; Bradley C. Fach; Steven R. Kick

(57) ABSTRACT

A wind turbine device may include four wings. A first wing may include a first leading edge and a first trailing edge, and a second wing may include a second leading edge a second trailing edge. The first and second leading edges may be positioned on opposite sides of the axis of rotation, the first and second trailing edges may be positioned on opposite sides of the axis of rotation, and the first and second leading edges may be positioned relatively further to the axis of rotation than the first and second trailing edges. A third wing may include a third leading edge and a third trailing edge, and a fourth wing may include a fourth leading edge and a fourth trailing edge. The third and fourth trailing edges may be each positioned proximate to the axis of rotation and positioned on opposite sides of the axis of rotation.

17 Claims, 10 Drawing Sheets

WIND TURBINE DEVICE

CROSS REFERENCE TO RELATED APPLICATIONS

This application claims priority to and the benefit of the filing date of U.S. Provisional Application No. 62/703,599, filed on Jul. 26, 2018, entitled "Dynamic Wind Turbine", which is hereby incorporated by reference in its entirety.

FIELD OF THE INVENTION

This patent specification relates to the field of devices used to harness the movement of air in order to generate electrical power. More specifically, this patent specification relates to a device configured for capturing wind and air movement energy for generating electrical power.

BACKGROUND

A need exists in the field of wind turbines. Renewable energy is a growing field, and highly efficient, safe, and accessible devices are lacking. A further need exists for wind turbine devices which allow for energy to be produced on a small or large scale, efficiently, safely, and powerfully. Old technology using propeller-driven, or some vertical wind turbines are inefficient, and many are dangerous due to poor engineering and outdated technologies and ideas, and have a negative effect on the animal environment.

Most wind power is generated using horizontal, wind-facing propeller-based turbines that are extremely inefficient; their use efficiency is at about 12-17% at best. They must: 1. Face the wind exactly, with little to no variance in wind direction; 2. Operate only at optimum wind speeds, normally between 10 and 27 mph, and if not in those speeds must be braked and stopped in use; 3. Be used carefully, as many propellers break easily in high winds and can be dangerous when the propellers break off, as has happened in Wyoming, Puerto Rico, etc. On top of the efficiency problems, there is an environmental impact in that the large-scale propeller turbines are tall enough to alter the migratory patterns of birds, and take the lives of many animals in their operation. Lastly, most propeller wind turbines are loud enough to approach public nuisance levels.

BRIEF SUMMARY OF THE INVENTION

A wind turbine device is provided. The device provides many advantages over existing devices, including: the ability to capture the wind from a 360 degree perspective (omnidirectional), with no variance in wind direction causing a hindrance in efficiency; the ability to operate at low rates of speed and still produce power in a highly efficient manner; the ability to capture wind at high speeds so as to not create danger or liability; the ability to operate above 87% efficiency; preferably operates at a height of under 18 feet, so no environmental impact on birds and other animals is felt; and the operation noise level is next to imperceptible.

In some embodiments, a first wing 11 may include a first leading edge 12 and a first trailing edge 13, and the first leading edge 12 and first trailing edge 13 may be separated by a first concave surface 14. A second wing 21 may include a second leading edge 22 a second trailing edge 23, and the second leading edge 22 and second trailing edge 23 may be separated by a second concave surface 24. The first leading edge 12 and second leading edge 22 may be positioned on opposite sides of the axis of rotation 70, the first trailing edge 13 and second trailing edge 23 may be positioned on opposite sides of the axis of rotation 70, and the first 12 and second leading edges 22 may be positioned relatively further to the axis of rotation 70 than the first 13 and second 23 trailing edges. A third wing 31 may include a third leading edge 32 and a third trailing edge 33, and the third leading edge 32 and third trailing edge 33 may be separated by a third concave surface 34. A fourth wing 41 may include a fourth leading edge 42 and a fourth trailing edge 43, and the fourth leading edge 42 and fourth trailing edge 43 may be separated by a fourth concave surface 44. The third trailing edge 33 and fourth trailing edge 43 may be each positioned proximate to the axis of rotation 70, and the third leading edge 32 and fourth leading edge 42 may be positioned on opposite sides of the axis of rotation 70.

In further embodiments, the device may include two or more wing assemblies which may be coupled together so that their axes of rotation are aligned.

In still further embodiments, the device may include six wing assemblies in which each wing assembly has a first angle of attack. The wing assemblies may be coupled together so that the first angle of attack of two adjacent wing assemblies may be approximately angled 30 degrees relative to each other.

In still further embodiments, the device may comprise or be operably coupled to a generator.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
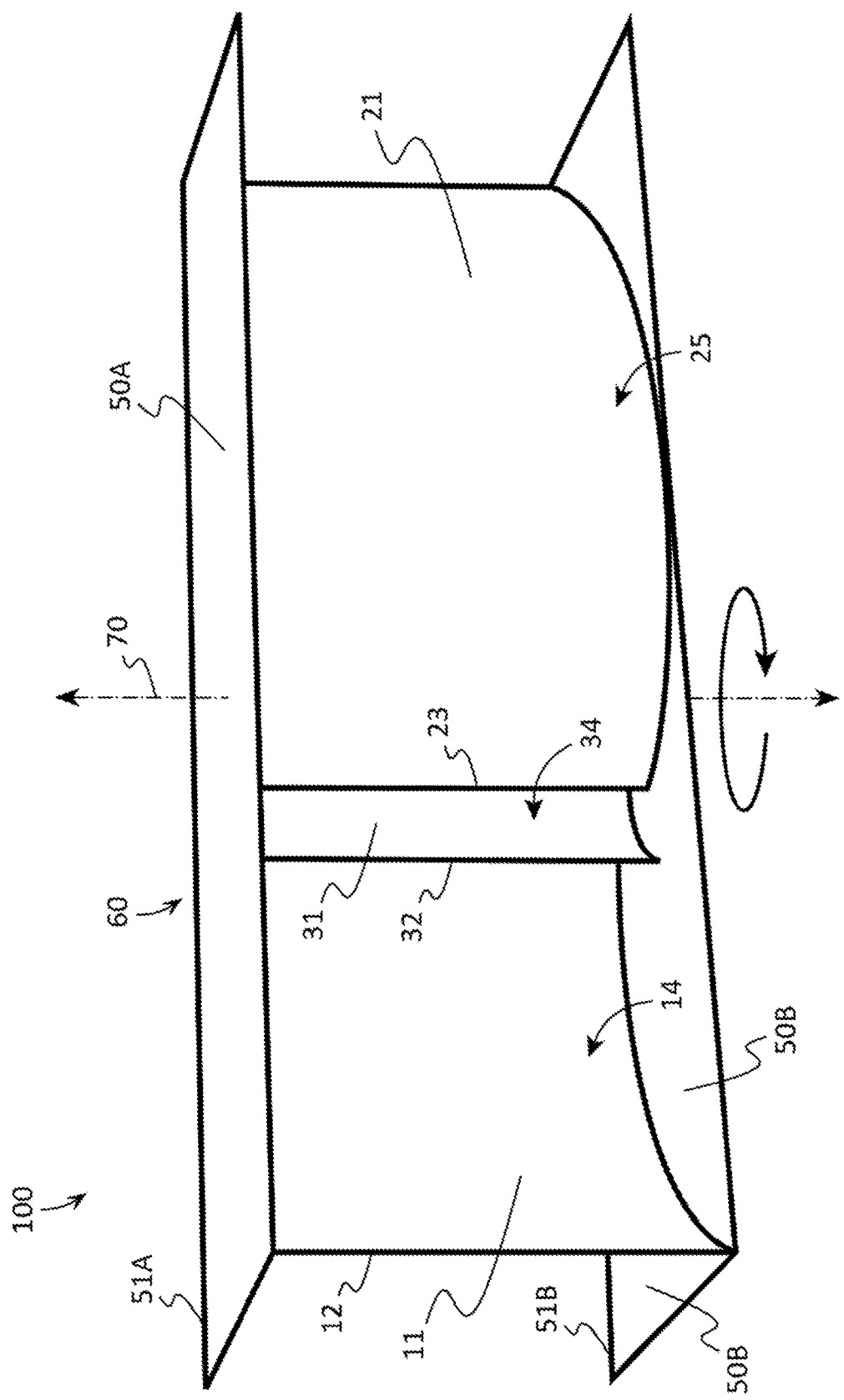
FIG. 1—FIG. 1 depicts a front perspective view of an example of a wind turbine device according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new device configured for capturing wind and air movement energy for generating electrical power is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1, 2, 4-7 illustrate examples of a wind turbine device ("the device") 100 according to various embodiments. The device 100 may comprise an axis of rotation 70 which may extend, generally centrally, through one or more wing assemblies 60. Preferably, each wing assembly 60 may include one or more, such as four wings, such as a first wing 11, second wing 21, third wing, 31, and a fourth wing 41. Moving air 200 or wind that contacts and moves across the wings 11, 21, 31, 41, causes the one or more wing assemblies 60 of the device 100 to spin or revolve on the axis of rotation 70.

In some embodiments, a first wing 11 may include a first leading edge 12 and a first trailing edge 13, and the first leading edge 12 and first trailing edge 13 may be separated by a first concave surface 14. A second wing 21 may include a second leading edge 22 a second trailing edge 23, and the second leading edge 22 and second trailing edge 23 may be separated by a second concave surface 24. The first leading edge 12 and second leading edge 22 may be positioned on opposite sides of the axis of rotation 70, the first trailing edge 13 and second trailing edge 23 may be positioned on opposite sides of the axis of rotation 70, and the first 12 and second leading edges 22 may be positioned relatively further to the axis of rotation 70 than the first 13 and second 23 trailing edges. A third wing 31 may include a third leading edge 32 and a third trailing edge 33, and the third leading edge 32 and third trailing edge 33 may be separated by a third concave surface 34. A fourth wing 41 may include a fourth leading edge 42 and a fourth trailing edge 43, and the fourth leading edge 42 and fourth trailing edge 43 may be separated by a fourth concave surface 44. The third trailing edge 33 and fourth trailing edge 43 may be each positioned proximate to the axis of rotation 70, and the third leading edge 32 and fourth leading edge 42 may be positioned on opposite sides of the axis of rotation 70.

The device 100 may comprise one or more plates 50 between which the wings 11, 21, 31, 41, may be positioned and coupled. In preferred embodiments, each wing assembly 60 may comprise a top plate 50A and a bottom plate 50B may be coupled to the first 11, second 21, third 31, and fourth 41 wings so that the wings 11, 21, 31, 41, may be disposed between the top plate 50A and the bottom plate 50B. Preferably, the top plate 50A and bottom plate 50B of a wing assembly 60 may be substantially parallel to each other. In further preferred embodiments having two or more wings assemblies 60 that are coupled together, each plate 50 of the device 100 may be substantially parallel to the other plates 50 of the device 100.

In further preferred embodiments having two or more wings assemblies 60 that are coupled together, the bottom plate 50B of an upper wing assembly 60 may be coupled to the top plate 50A of an adjacent and lower wing assembly. In other preferred embodiments having two or more wings assemblies 60 that are coupled together, all or portions of the bottom plate 50B of an upper wing assembly 60 may form all or portions of the top plate 50A of an adjacent and lower wing assembly. In this manner, one plate 50 may be the lower plate 50B and upper plate 50A of two adjacent wing assemblies 60.

Figure 2:
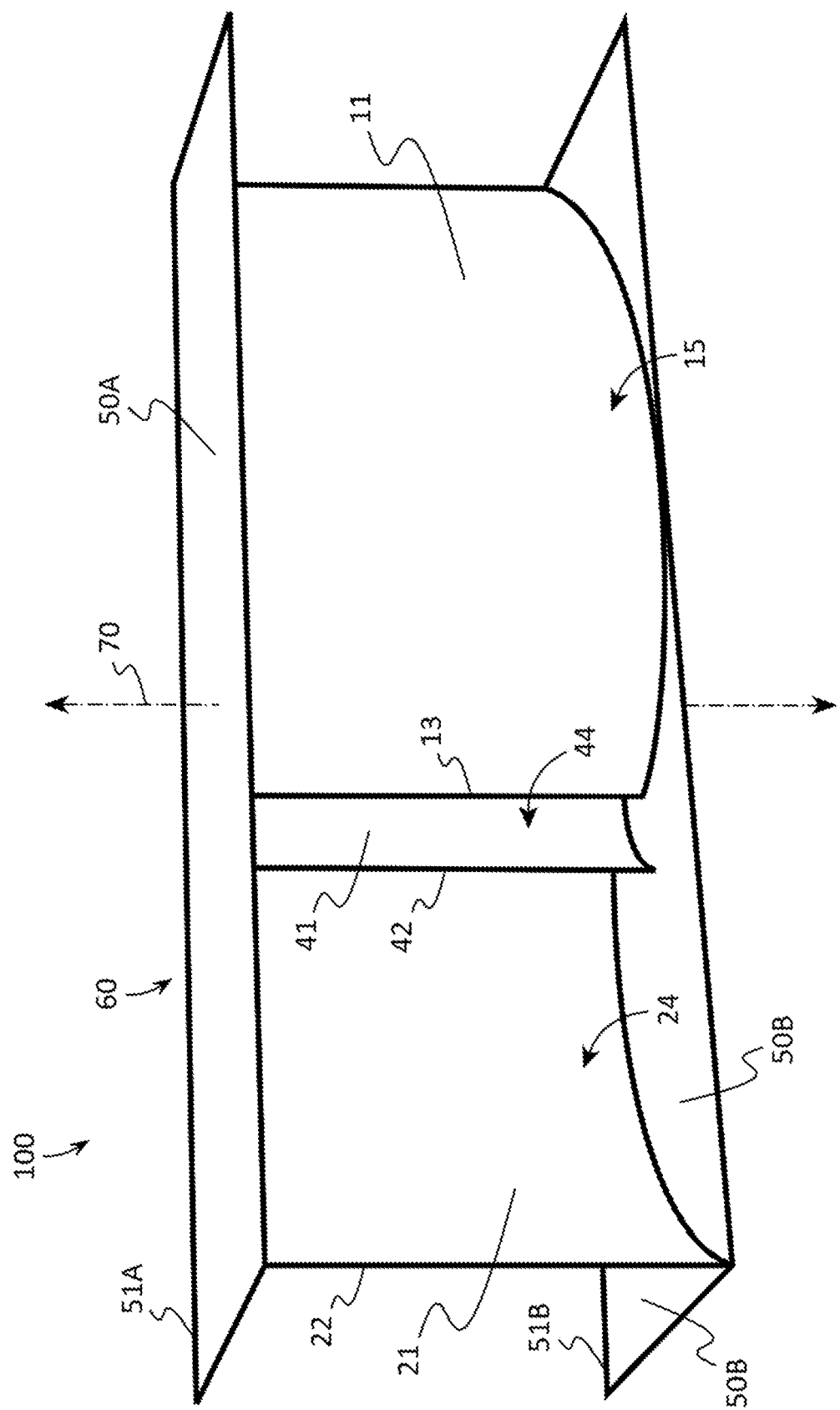
FIG. 2—FIG. 2 illustrates a rear perspective view of an example of a wind turbine device according to various embodiments described herein.

The plates 50 of the device 100 may be configured in any size and shape, including different sizes and shapes. In preferred embodiments, a plate 50 may be configured in a flat planar shape, such as a flat planar rectangle shape (as best shown in FIGS. 1 and 2), flat planar oval shape, or any other flat planar shape, including combinations of shapes. Generally, each plate 50 may comprise a perimeter 51. For example, a top plate 50A may comprise a top perimeter 51A and a bottom plate 50B may comprise a bottom perimeter 51B. In preferred embodiments, the plates 50A, 50B, of a wing assembly 60 may be configured with rectangular shaped perimeters 51A, 51B, with approximately similar dimensions.

In some embodiments, each wing 11, 21, 31, 41, may be generally curved in shape. In preferred embodiments, each wing 11, 21, 31, 41, may comprise a curved planar shape, such as a wall section of a cone or cylinder. The curve shape of a wing 11, 21, 31, 41, may be provided by a concave surface 14, 24, 34, 44, and an opposing convex surface 15, 25, 35, 45. In this manner, a first wing 11 may comprise a first concave surface 14 and an opposing first convex surface 15, a second wing 21 may comprise a second concave surface 24 and an opposing second convex surface 25, a third wing 31 may comprise a third concave surface 34 and an opposing third convex surface 35, and a fourth wing 41 may comprise a fourth concave surface 44 and an opposing fourth convex surface 45. Preferably, one or more wings 11, 21, 31, 41, of a wing assembly 60 may comprise a curved planar shape, such as a wall section of a cylinder, and one or more concave surfaces 14, 24, 34, 44, and/or one or more opposing convex surfaces 15, 25, 35, 45, may be substantially perpendicular to the top plate 50A and/or bottom plate 50B of the wing assembly 60. In further embodiments, the first leading edge 12 and/or the second leading edge 22 of a wing assembly 60 may contact a portion of the top perimeter 51A and/or the bottom perimeter 51B of the plates 50A, 50B, of the wing assembly 60.

In preferred embodiments and as best shown in FIGS. 3A-3D, a wing assembly 60 may comprise four wings 11, 21, 31, 41, which may be positioned so that the third 31 and fourth 41 wings are generally positioned between the first 11 and second 21 wings. In some embodiments, the first trailing edge 13 of a first wing 11 may be positioned approximately between 90 to 110 percent of being equidistant to the third leading edge 32 and the third trailing edge 33 of the third wing 31. In further embodiments, the second trailing edge 23 of a second wing 21 may be positioned approximately between 90 to 110 percent of being equidistant to the fourth leading edge 42 and the fourth trailing edge 43 of the fourth wing 41. As an example, a first trailing edge 13 of a first wing 11 that is positioned 100 percent of being equidistant to the third leading edge 32 and the third trailing edge 33 of the third wing 31 may be positioned centrally between the third leading edge 32 and the third trailing edge 33. As another example, a first trailing edge 13 of a first wing 11 that is positioned 91 percent of being equidistant to the third leading edge 32 and the third trailing edge 33 of the third wing 31 may be positioned 9 percent closer to the third leading edge 32 than to the third trailing edge 33.

Figure 3A:
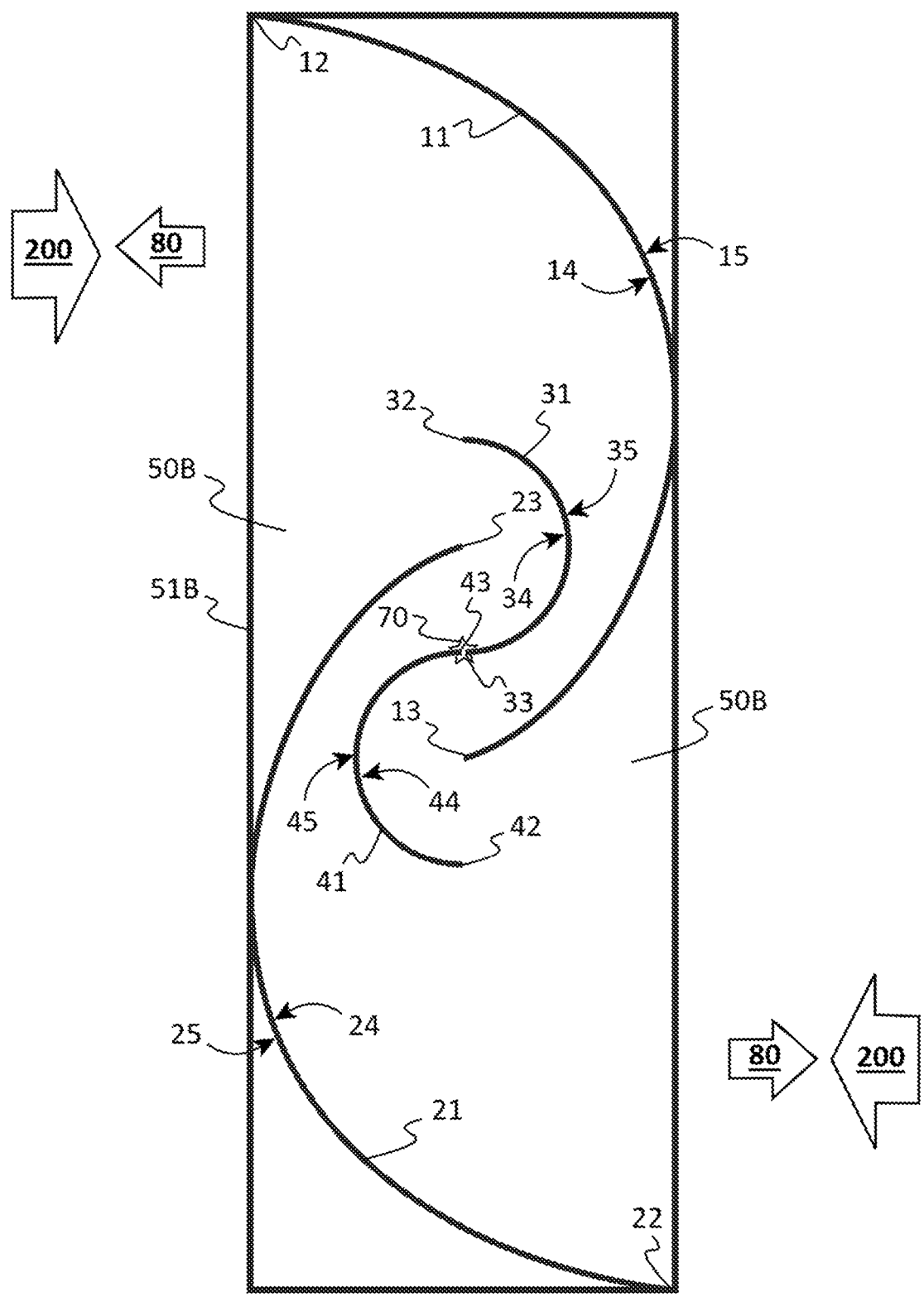
FIG. 3A—FIG. 3A shows a top plan view of an example of a wing assembly having a top plate removed according to various embodiments described herein.
Figure 3B:
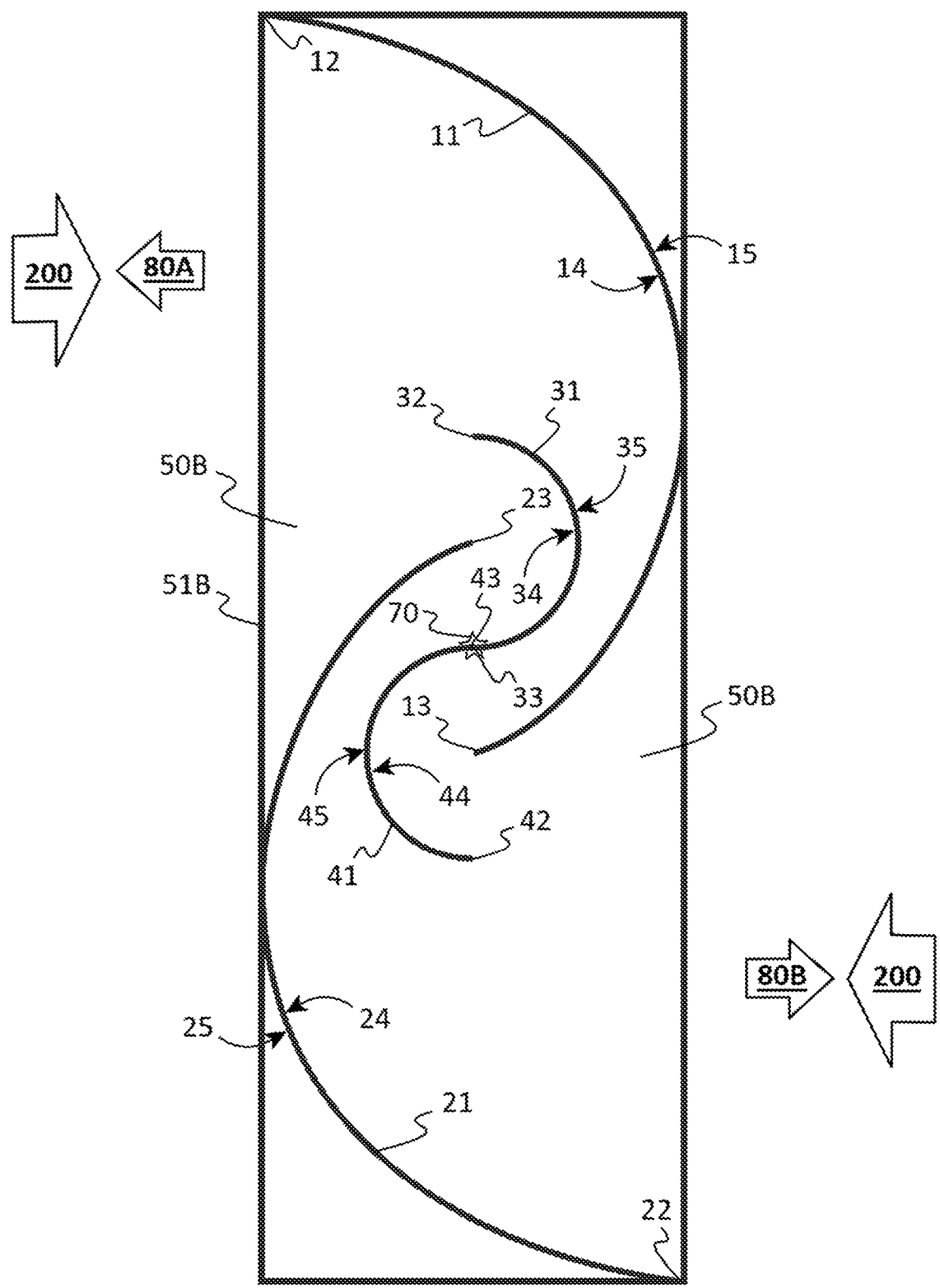
FIG. 3B—FIG. 3B depicts a top plan view of another example of a wing assembly having a top plate removed according to various embodiments described herein.
Figure 3C:
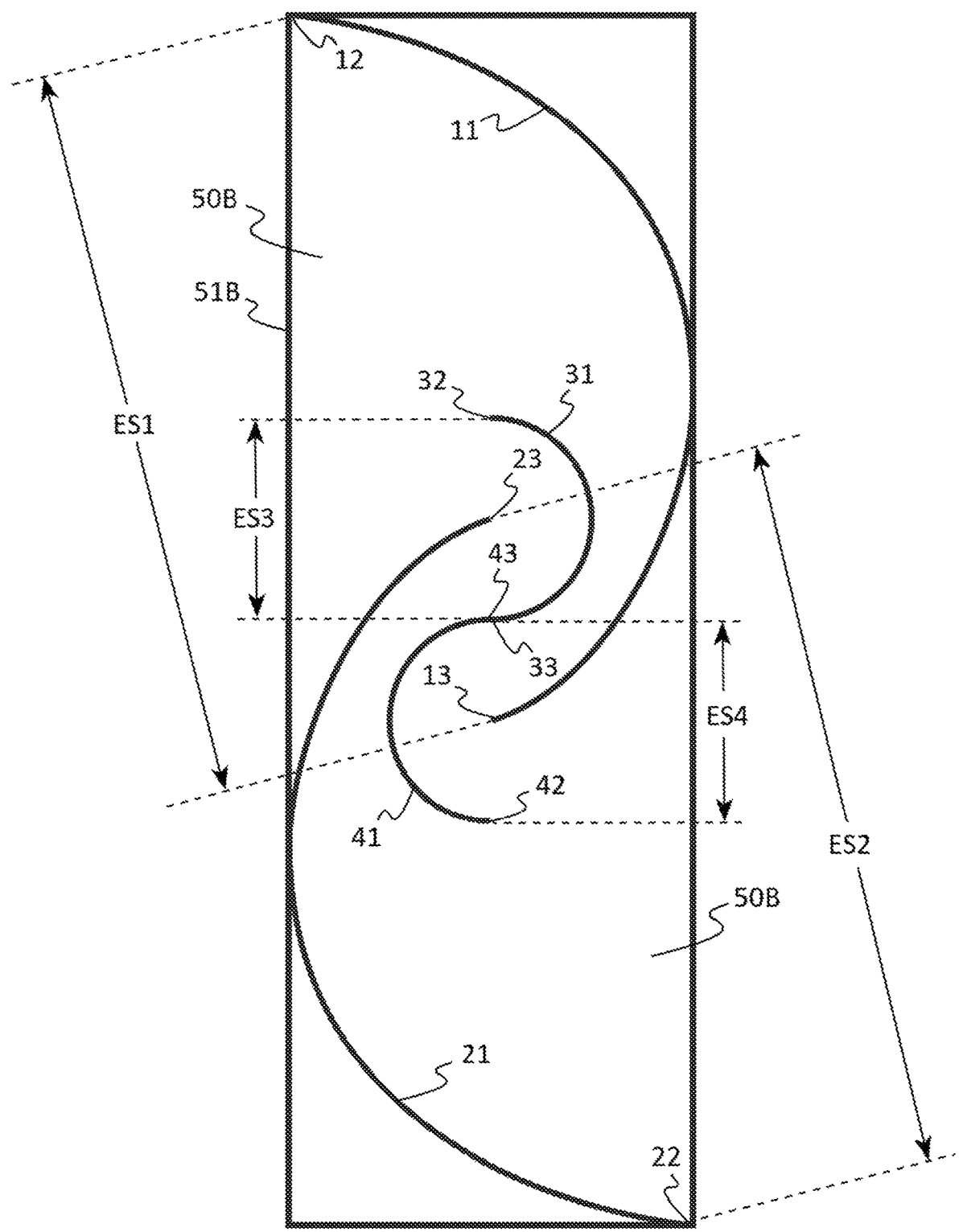
FIG. 3C—FIG. 3C illustrates a further top plan view of another example of a wing assembly having a top plate removed according to various embodiments described herein.
Figure 3D:
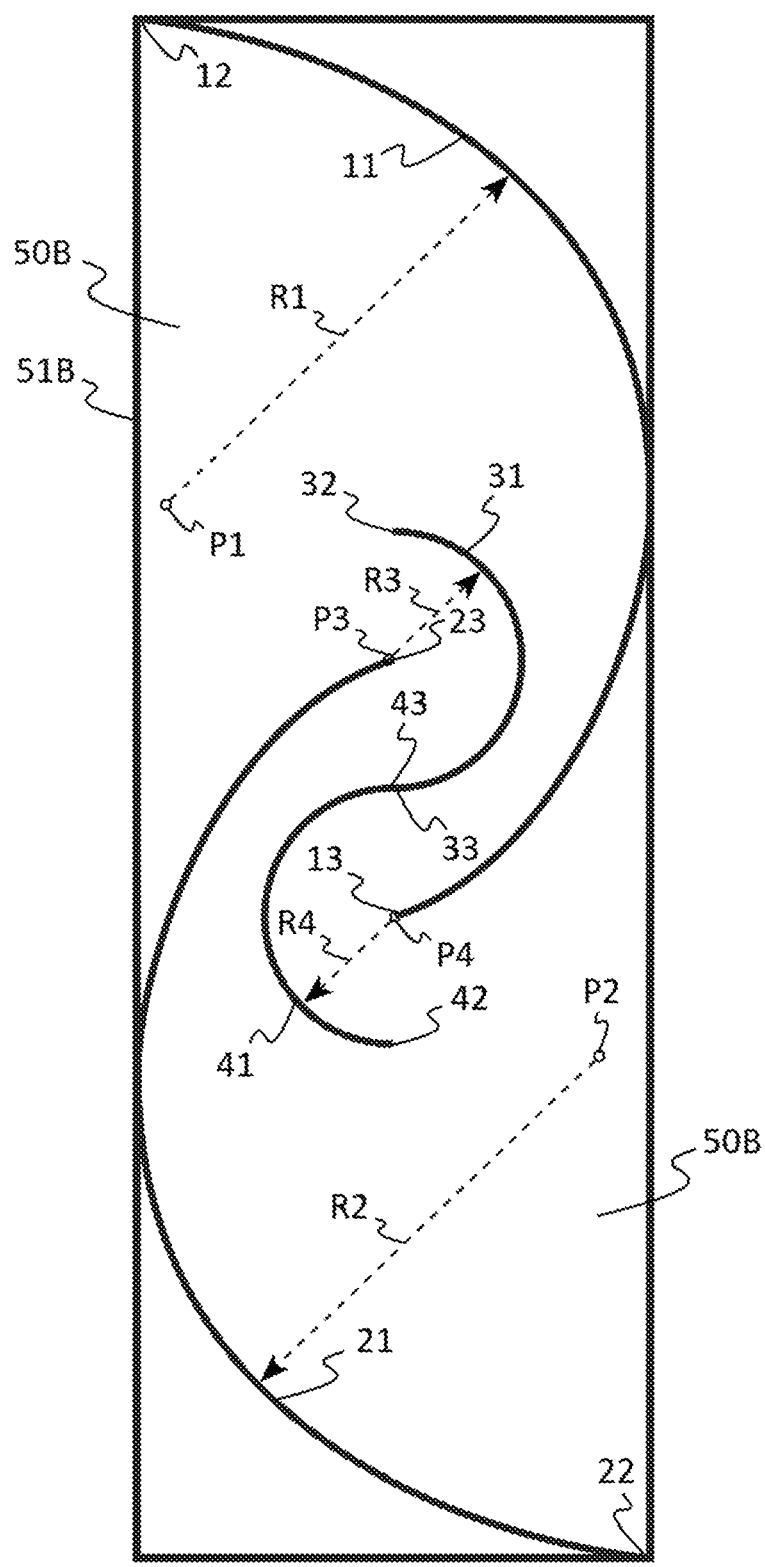
FIG. 3D—FIG. 3D shows still a further top plan view of another example of a wing assembly having a top plate removed according to various embodiments described herein.

Optionally, the third wing 31 and the fourth wing 41 may be positioned in contact with each other or they may be positioned proximate to each other. In some embodiments and as shown in FIGS. 3B-3D, the third trailing edge 33 of the third wing 31 and the fourth trailing edge 43 of the fourth wing 41 may contact each other. In further embodiments and as shown in FIG. 3B-3D, the third trailing edge 33 of the third wing 31 and the fourth trailing edge 43 of the fourth wing 41 may contact the axis of rotation 70. In other embodiments and as shown in FIG. 3A, the third trailing edge 33 of the third wing 31 and the fourth trailing edge 43 of the fourth wing 41 may be positioned proximate to each other (so that the third trailing edge 33 and fourth trailing edge 43 are closer to each other than the first trailing edge 13 is to the second trailing edge 23). In further embodiments and as shown in FIG. 3A, the third trailing edge 33 of the third wing 31 and the fourth trailing edge 43 of the fourth wing 41 may be positioned proximate to the axis of rotation 70 (so that the third trailing edge 33 and fourth trailing edge 43 are closer to the axis of rotation 70 than the first trailing edge 13 and the second trailing edge 23 are).

Turning now to FIG. 3C, a wing assembly 60 may comprise a first edge separation distance (ES1), a second edge separation distance (ES2), a third edge separation distance (ES3), and a fourth edge separation distance (ES4). A first edge separation distance (ES1) may define the distance between the first leading edge 12 and the first trailing edge 13 of a first wing 11. A second edge separation distance (ES2) may define the distance between the second leading edge 22 and the second trailing edge 23 of a second wing 21. A third edge separation distance (ES3) may define the distance between the third leading edge 32 and the third trailing edge 33 of a third wing 31. A fourth edge separation distance (ES4) may define the distance between the fourth leading edge 42 and the fourth trailing edge 43 of a fourth wing 41. In some embodiments, ES3 may be between 20 to 40 percent of ES1 and/or ES4 may be between 20 to 40 percent of ES2. In further embodiments, ES1 may be between approximately 95 and 105 percent of ES2 and/or ES3 may be between approximately 95 and 105 percent of ES4.

As shown in FIG. 3D, a wing assembly 60 may comprise a first radius (R1), a second radius (R2), a third radius (R3), and a fourth radius (R4). A first radius (R1) may define a distance to a point (P1) that is approximately equidistant from all portions of a first convex surface 14 of a first wing 11. A second radius (R2) may define a distance to a point (P2) that is approximately equidistant from all portions of a second convex surface 24 of a second wing 21. A third radius (R3) may define a distance to a point (P3) that is approximately equidistant from all portions of a third convex surface 34 of a third wing 31. A fourth radius (R4) may define a distance to a point (P4) that is approximately equidistant from all portions of a fourth convex surface 44 of a fourth wing 41. It should also be understood that a radius R1, R2, R3, R4, may define a point around which a convex surface 13, 23, 33, 43, configured as a section of a spiral may be defined. For example, R1 may be greater as measured to the first leading edge 12 than to the first trailing edge 13 of a first wing 11 having a decreasing spiral curved shape. In preferred embodiments, R3 may be between 15 to 35 percent of R1 and/or R4 may be between 15 to 35 percent of R2.

Figure 3E:
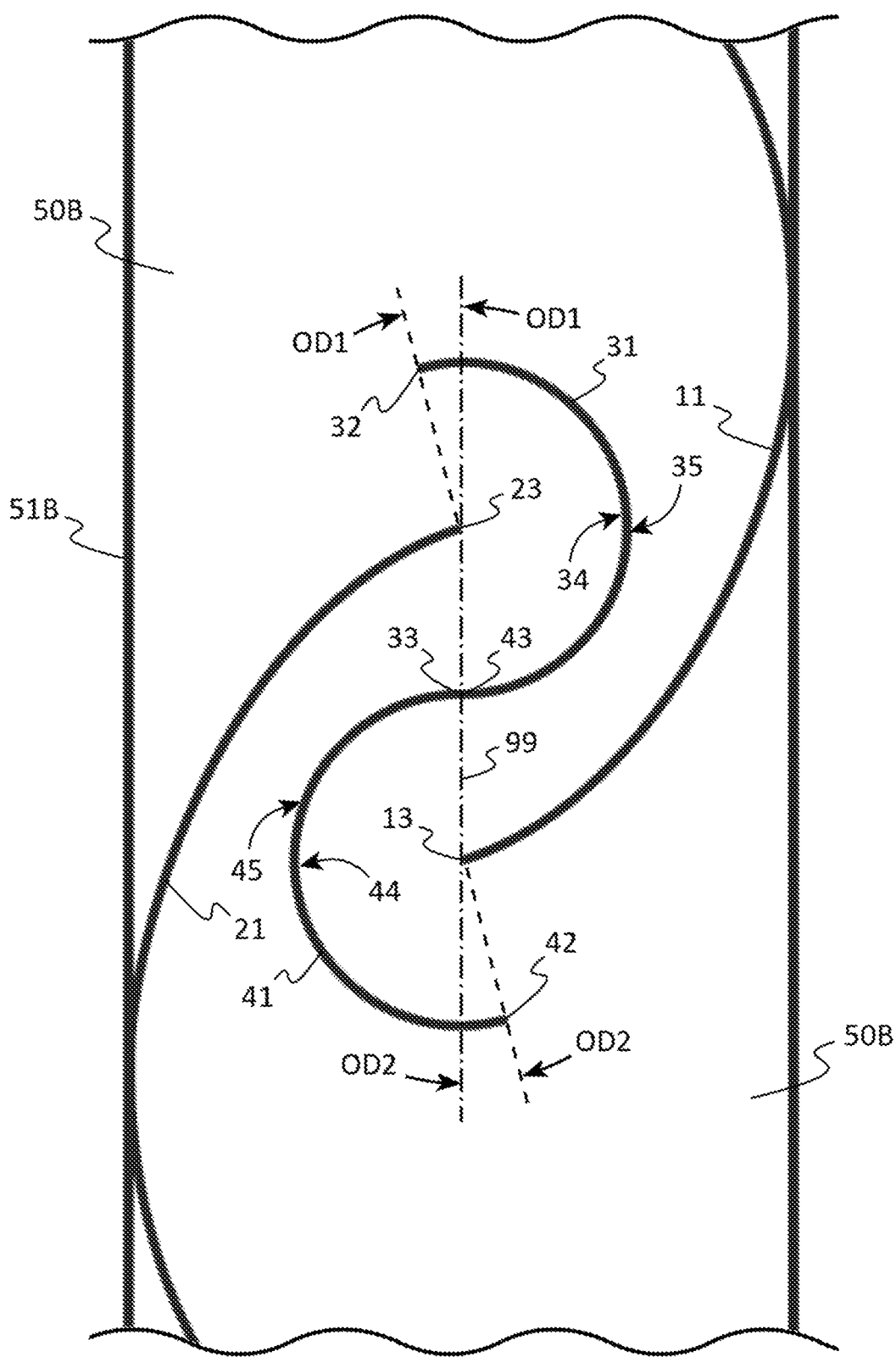
FIG. 3E—FIG. 3E illustrates a top plan partial view of another example of a wing assembly having a top plate removed according to various embodiments described herein.

As shown in FIG. 3E, a wing assembly 60 may comprise a first offset distance (OD1) and a second offset distance (OD2). A first offset distance (OD1) may define a distance that describes how far the third leading edge 32 is positioned relative to a bisecting line 99 that intersects the second trailing edge 23 and first trailing edge 13. Likewise, a second offset distance (OD2) may define a distance that describes how far the fourth leading edge 42 is positioned relative to a bisecting line 99 that intersects the second trailing edge 23 and first trailing edge 13. For example, a positive first offset distance OD1 would describe the third leading edge 32 extending past the bisecting line 99, while a negative first offset distance OD1 would describe the third leading edge 32 not meeting the bisecting line 99. In preferred embodiments, OD1 may be between +5 to +20 percent, and more preferably between +10 to +15, percent of the diameter of a circle whose arc describes the curvature of the third concave surface 34 and/or third convex surface 35. For example, a wing assembly 60 having an OD1 of +12.5 percent of a third concave surface 34 and/or third convex surface 35 formed by an arc of an eight inch circle may extend past a bisecting line 99 that intersects the second trailing edge 23 and first trailing edge 13 by approximately one inch. In further preferred embodiments, OD2 may be between +5 to +20 percent, and more preferably between +10 to +15, percent of the diameter of a circle whose arc describes the curvature of the fourth concave surface 44 and/or fourth convex surface 45. In further embodiments, OD1 may be between −20 to +20 percent of the diameter of a circle whose arc describes the curvature of the third concave surface 34 and/or third convex surface 35. In still further embodiments, OD2 may be between −20 to +20 percent of the diameter of a circle whose arc describes the curvature of the fourth concave surface 44 and/or fourth convex surface 45.

Figure 4:
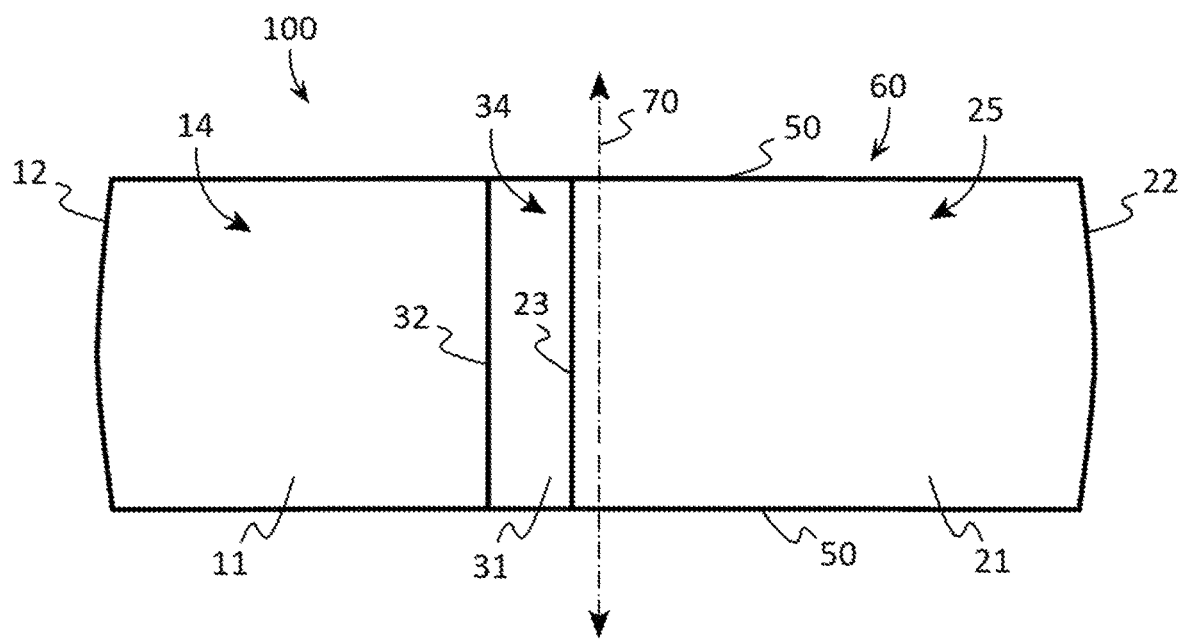
FIG. 4—FIG. 4 depicts a side elevation view of an example of a wing assembly according to various embodiments described herein.
Figure 5:
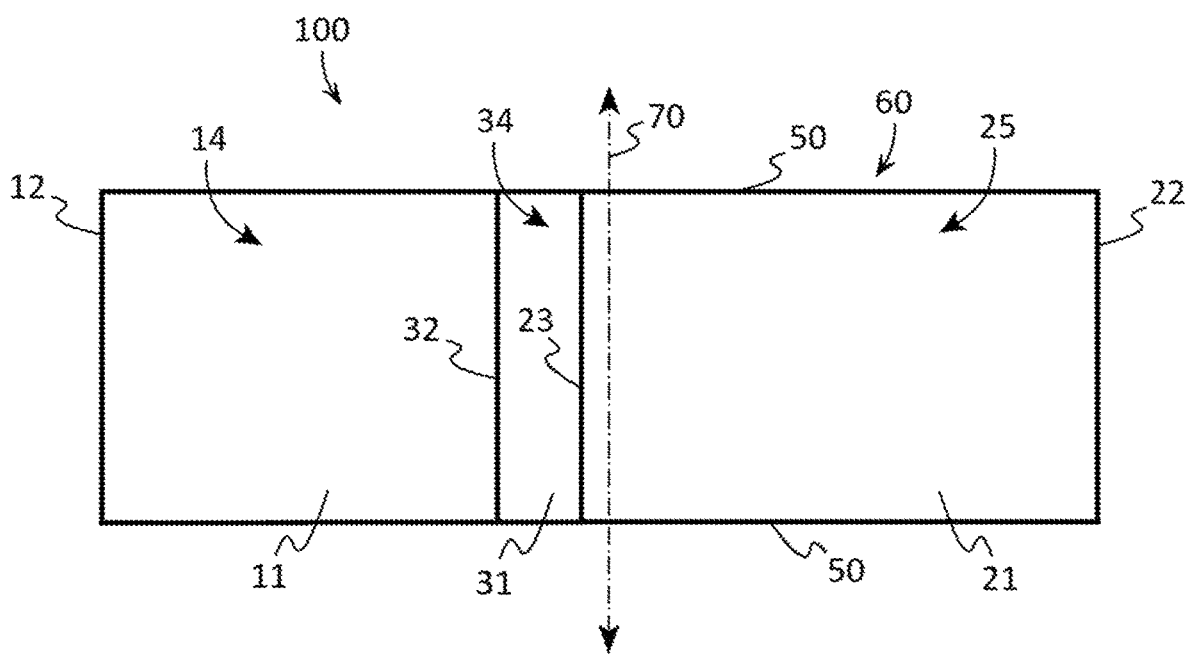
FIG. 5—FIG. 5 illustrates a side elevation view of a further example of a wing assembly according to various embodiments described herein.

In some embodiments, a first leading edge 12 and/or a second leading edge 22 may be convex curved away from the axis of rotation 70 as shown in FIG. 4. Likewise, a third leading edge 32 and/or a fourth leading edge 42 may be convex curved away from the axis of rotation 70. In other embodiments, a first leading edge 12 and/or a second leading edge 22 may be approximately parallel to the axis of rotation 70 as shown in FIG. 5. Likewise, a third leading edge 32 and/or a fourth leading edge 42 may be approximately parallel to the axis of rotation 70.

Figure 6:
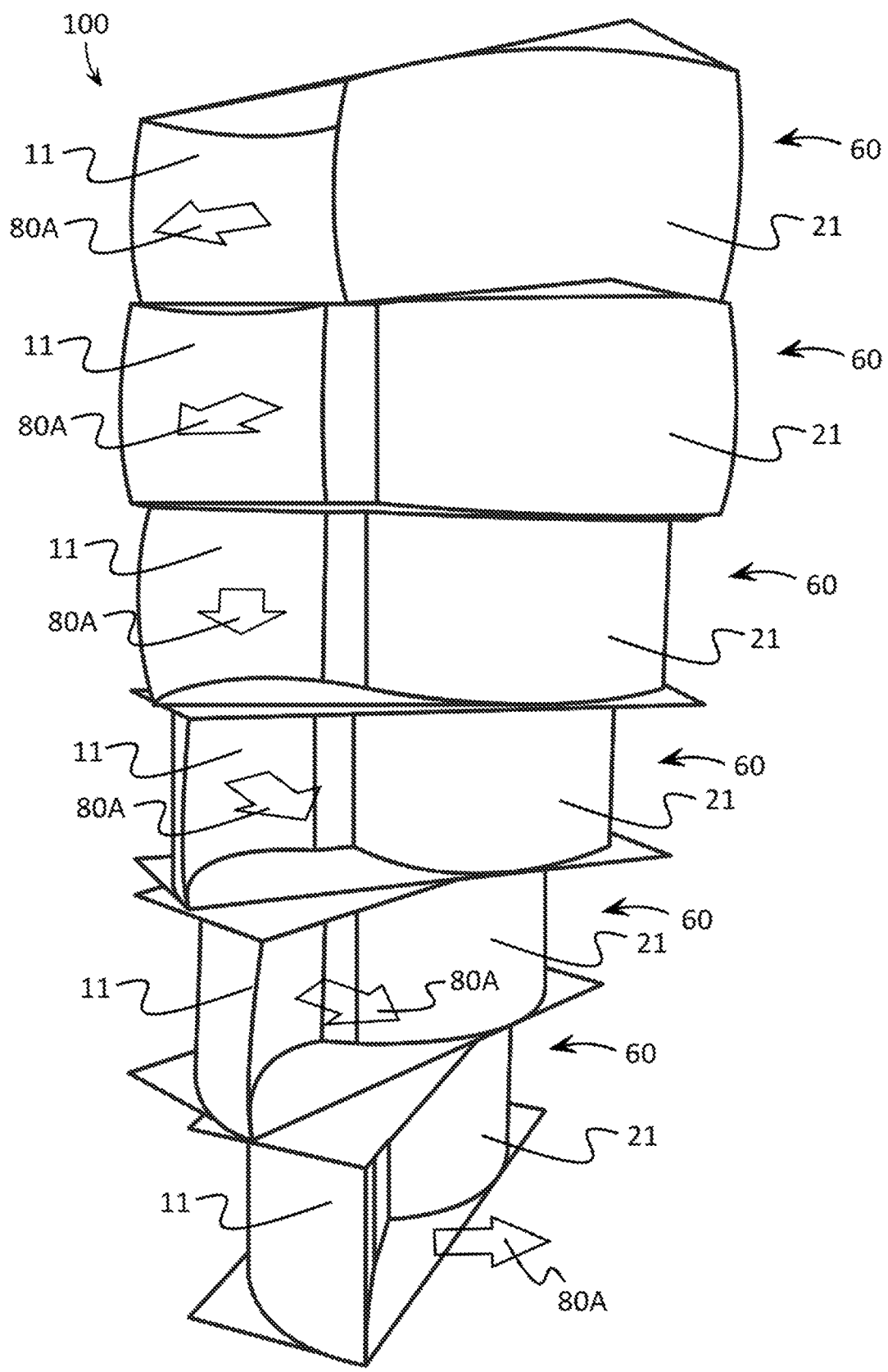
FIG. 6—FIG. 6 shows a perspective view of another example of a wind turbine device according to various embodiments described herein.

In some embodiments, the device 100 may comprise two or more wing assemblies 60. Generally, the wing assemblies 60 may be stacked and coupled together so that the axis of rotation 70 of each wing assembly is vertically aligned. In this manner the axes of rotation 70 or the wing assemblies 60 may form the axis of rotation 70 of the device 100. Each wing assembly 60 may comprise an angle of attack 80 as shown in FIGS. 3A, 3B, and 6. An angle of attack 80 may simply refer to a direction which is opposite to the direction of moving air 200 that when moving across the concave surfaces 14, 24, 34, 44, of a wing assembly 60 exerts the greatest force on the concave surfaces 14, 24, 34, 44, to rotate the wing assembly 60 around the axis of rotation 70. A wing assembly 60 having four wings 11, 21, 31, 41, may comprise a first angle of attack 80A and a second angle of attack 80B. In preferred embodiments, a device 100 having two or more wing assemblies 60 may have the wing assemblies oriented so that the first angle of attack 80A (and therefore the second angle of attack 80B) of at least two wing assemblies 60 are in different directions relative to each other. In preferred embodiments, the device 100 may comprise six wing assemblies 60, each having a first angle of attack 80A, and each first angle of attack 80A may be approximately angled 30 degrees relative to two other first angles of attack 80A of two other wing assembles 60. Since a wing assembly 60 comprises two angles of attack 80A, 80B, by having six wing assemblies 60 coupled together and angled approximately 30 between two adjacent wing assemblies, the device 100 may have twelve angles of attack 80 to accept 360 degrees of moving air 200.

Figure 7:
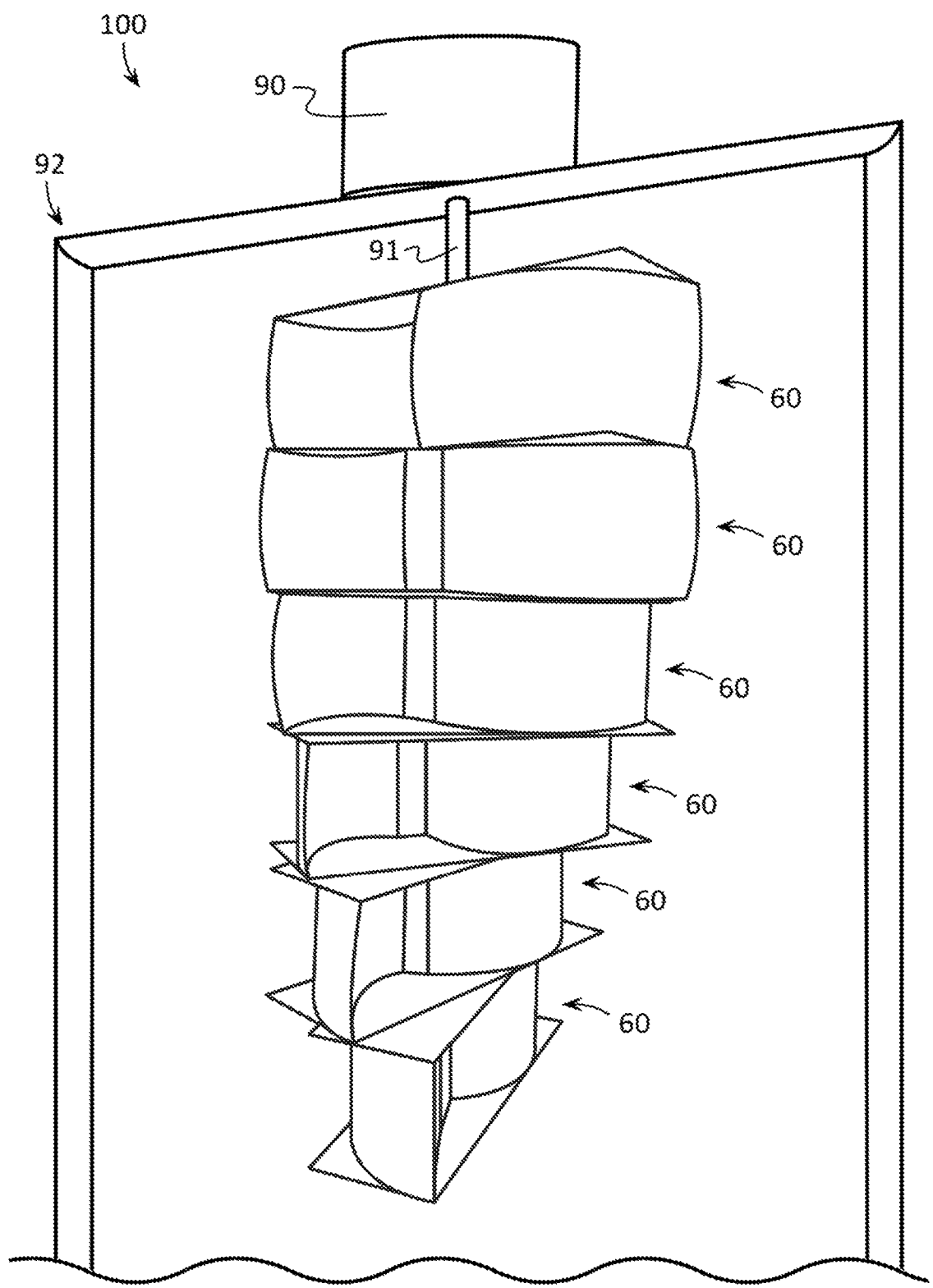
FIG. 7—FIG. 7 depicts a perspective view of still another example of a wind turbine device according to various embodiments described herein.

In some embodiments and as shown in FIG. 7, the device 100 may comprise and/or may be operably coupled to a generator 90. As moving air 200 causes the one or more wind assemblies 60 to rotate around the axis of rotation 70, the rotational motion of the one or more wind assemblies 60 may be communicated to a generator 90 which may convert the rotational motion or energy into another form of energy or movement. In preferred embodiments, a generator 90 may comprise a device that converts rotational motive power (mechanical energy) into electrical power. In other embodiments, a generator 90 may comprise a device that converts rotational motive power (mechanical energy) into any other form of energy which may be used to perform work or stored. In further preferred embodiments, a device 100 may comprise one or more shafts 91 which may be aligned with the axis of rotation 70. A shaft 91 may be used to operably couple the wind assemblies 60 to a generator 90 and/or to movably couple the wind assemblies 60 to a support structure 92 which may be used to support and position the wind assemblies 60 relative to an object or surface.

While some exemplary shapes and sizes have been provided for elements of the device 100, it should be understood to one of ordinary skill in the art that the wings 11, 21, 31, 41, plates 50, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, in some embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A wind turbine device having an axis of rotation, the device comprising:
   a first wing having a first leading edge and a first trailing edge, the first leading edge and first trailing edge separated by a first concave surface;
   a second wing having a second leading edge and a second trailing edge, the second leading edge and second trailing edge separated by a second concave surface, wherein the first leading edge and second leading edge are positioned on opposite sides of the axis of rotation, wherein the first trailing edge and second trailing edge are positioned on opposite sides of the axis of rotation, and wherein the first and second leading edges are positioned relatively further to the axis of rotation than the first and second trailing edges;
   a third wing having a third leading edge and a third trailing edge, the third leading edge and third trailing edge separated by a third concave surface;
   a fourth wing having a fourth leading edge and a fourth trailing edge, the fourth leading edge and fourth trailing edge separated by a fourth concave surface, wherein the third trailing edge and fourth trailing edge are each positioned proximate to the axis of rotation, and wherein the third leading edge and fourth leading edge are positioned on opposite sides of the axis of rotation;
   a top plate and a bottom plate coupled to the first, second, third, and fourth wings so that the wings are disposed between the top plate and the bottom plate, the top plate and the bottom plate each forming a flat planar rectangle shape and each comprising rectangular shaped perimeters having four right angle corners; and
   wherein the first leading edge and the second leading edge each contact a portion of both the top perimeter and a portion of the bottom perimeter and wherein the first leading edge is further contacting a first right angle corner and the second leading diagonally opposed to the second right angle corner.

2. The device of claim 1, wherein the top plate and the bottom plate are substantially parallel to each other.

3. The device of claim 1, wherein a concave surface is substantially perpendicular to the top plate, the concave surface selected from the group consisting of the first concave surface, second concave surface, third concave surface, and fourth concave surface.

4. The device of claim 1, wherein the third trailing edge and the fourth trailing edge contact each other.

5. The device of claim 1, wherein the first leading edge is convex curved away from the axis of rotation.

6. The device of claim 1, further comprising a first edge separation distance (ES1) and a third edge separation distance (ES3), wherein ES3 is between 20 to 40 percent of ES1.

7. The device of claim 1, wherein the first wing comprises a first radius (R1) and the third wing comprises a third radius (R3), and wherein R3 is between 15 to 35 percent of R1.

8. A wind turbine device having an axis of rotation, the device comprising two or more wing assemblies that are coupled together with each wing assembly comprising:
   a first wing having a first leading edge and a first trailing edge, the first leading edge and first trailing edge separated by a first concave surface;
   a second wing having a second leading edge and a second trailing edge, the second leading edge and second trailing edge separated by a second concave surface, wherein the first leading edge and second leading edge are positioned on opposite sides of the axis of rotation, wherein the first trailing edge and second trailing edge are positioned on opposite sides of the axis of rotation, and wherein the first and second leading edges are positioned relatively further to the axis of rotation than the first and second trailing edges;
   a third wing having a third leading edge and a third trailing edge, the third leading edge and third trailing edge separated by a third concave surface;
   a fourth wing having a fourth leading edge and a fourth trailing edge, the fourth leading edge and fourth trailing edge separated by a fourth concave surface, wherein the third trailing edge and fourth trailing edge are each positioned proximate to the axis of rotation, and wherein the third leading edge and fourth leading edge are positioned on opposite sides of the axis of rotation;
   a top plate and a bottom plate coupled to the first, second, third, and fourth wings so that the wings are disposed between the top plate and the bottom plate, the top plate and the bottom plate each forming a flat planar rectangle shape and each of the top plate and the bottom plate comprising rectangular shaped perimeters having four right angle corners; and
   wherein the first leading edge and the second leading edge each contract a portion of both the top perimeter and a portion of the bottom perimeter and wherein the first leading edge is further contacting a first right angle corner and the second leading edge is further contacting a second right angle corner, the first right angle corner diagonally opposed to the second right angle corner; and
   wherein the third leading edge extends outwardly past the second trailing edge by a first offset distance (OD1) and wherein the fourth leading edge extends outwardly past the first trailing edge by a second offset distance (OD2).

9. The device of claim 8, wherein each wing assembly comprises a first angle of attack, and wherein the first angle of attack of at least two wing assemblies are in different directions relative to each other.

10. The device of claim 8, wherein the device comprises six wing assemblies.

11. The device of claim 10, wherein each wing assembly comprises a first angle of attack, and wherein the wing assemblies are coupled together so that the first angle of attack of two adjacent wing assemblies is substantially angled 30 degrees relative to each other.

12. The device of claim 8, wherein a generator is operably coupled to the wing assemblies.

13. The device of claim 8, wherein the top plate and the bottom plate are substantially parallel to each other.

14. The device of claim 8, wherein a concave surface is substantially perpendicular to the top plate, the concave surface selected from the group consisting of the first concave surface, second concave surface, third concave surface, and fourth concave surface.

15. The device of claim 8, wherein the third trailing edge and the fourth trailing edge contact each other.

16. The device of claim 8, further comprising a first edge separation distance (ES1) and a third edge separation distance (ES3), wherein ES3 is between 20 to 40 percent of ES1.

17. The device of claim 8, wherein the first wing comprises a first radius (R1) and the third wing comprises a third radius (R3), and wherein R3 is between 15 to 35 percent of R1.

* * * * *